June 12, 1928. 1,673,174
W. G. ALLEN
METHOD OF GRADING MATERIALS
Filed June 26, 1925  2 Sheets-Sheet 2
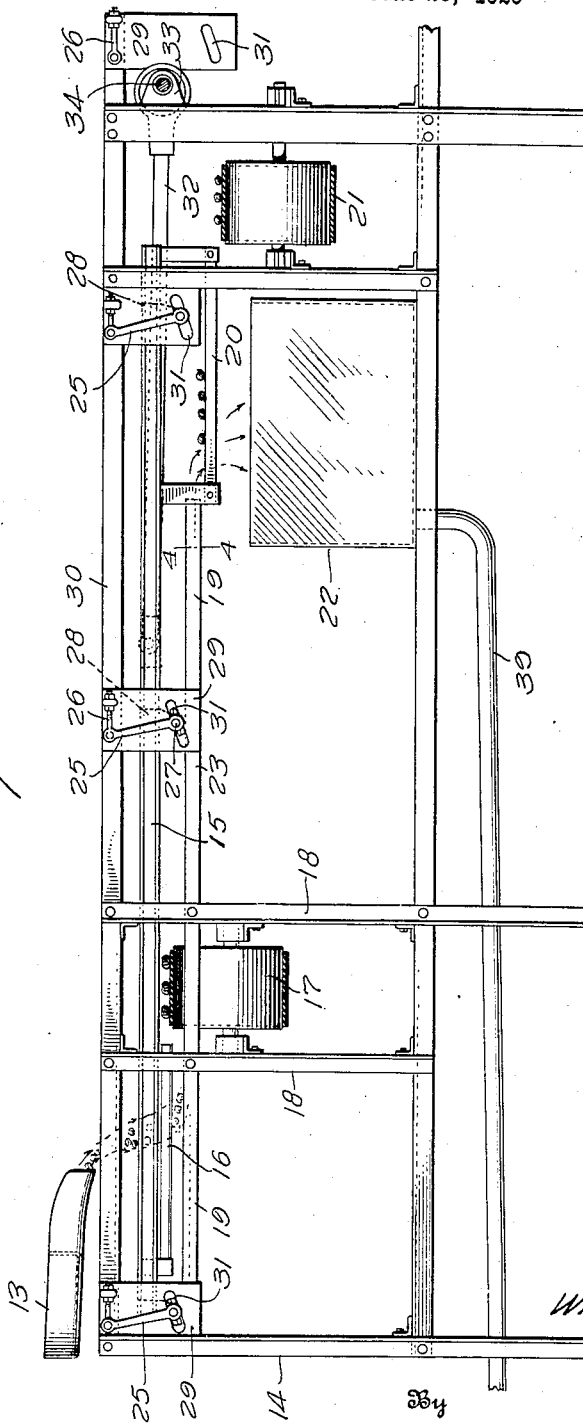
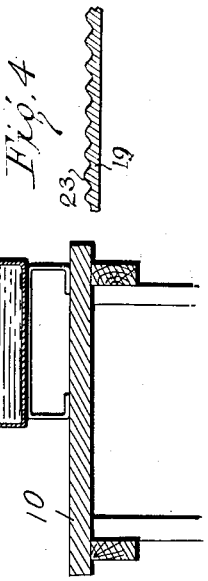
Inventor
WILLIAM G. ALLEN,
By
Robb Robb & Hill
Attorneys Patented June 12, 1928.

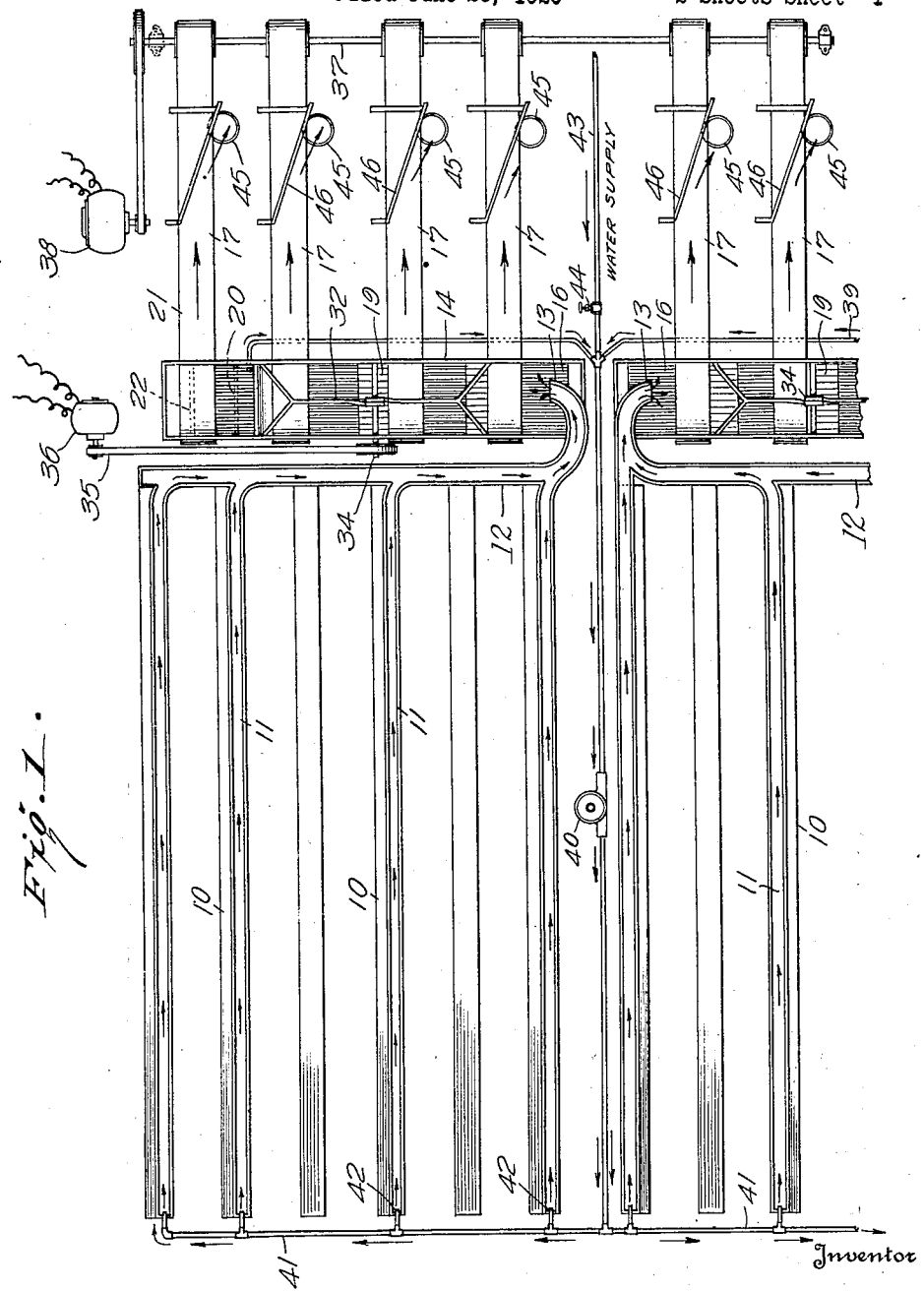

1,673,174

UNITED STATES PATENT OFFICE.

WILLIAM G. ALLEN, OF SALEM, OREGON.

METHOD OF GRADING MATERIALS.

Application filed June 26, 1925. Serial No. 39,765.

This invention relates to a method of grading materials, and particularly to the use of a liquid conveying medium for the transportation of the material to and through a grading mechanism.

In the ordinary methods of grading materials such as fresh fruits they are fed to the grader in a dry condition and passed by gravity from one grading surface to another. Such process does not carry the material forward except by the vibratory movement of the grader and the ripe fruit in such movement is liable to bruising and injury and is not fed in a uniform layer upon the grading and conducting surfaces but becomes piled thereon, which results in inefficient grading.

To overcome such objections I provide a novel method of collecting and conveying the fruit to a grader and also separating and conducting the fruit through the grader by means of a flowing body of liquid. This is preferably running water which first conveys the material from the preparation tables where it is stemmed or otherwise treated, and centralizes its delivery to the grader. The action of the water upon the fresh fruit reduces the temperature thereof and has a tendency to chill the fruit which prevents deterioration and oxidation by a firming thereof. The passage of the fruit in the liquid conveying medium washes the same and further tends to expel the excess oxygen in the fruit cells. If the fruit is deprived of such oxygen it liberates carbon dioxide gas which has a tendency to reduce the amount of oxygen actually present when the fruit is canned, and the consequent tendency of the fruit to ferment or form gas within the container.

My novel method further provides for the conduction of the fruit through a grading apparatus by means of the body of liquid as in passing through the primary grading surface only the larger fruit is retained thereby, the remainder being cushioned by the falling water and deposited upon a fixed corrugated or channeled water table which delivers upon a subsequent grading surface and the water is finally collected and returned by a circulating pump to the troughs disposed at the preparation tables. Under this novel method the different grades are separately delivered from the grader and adapted to be immediately introduced into the can or container for that purpose.

The invention has for an object to provide a novel and improved method of grading material consisting in conveying it from a place of preparation by a flowing body of liquid and delivering the material with the conveying medium to a grading device in a uniform manner.

A further object of the invention is to provide a new method of grading fruit consisting in depositing the same after preparation in a flowing liquid by which the fruit is conveyed to a grader retaining a portion of the fruit upon a primary grading surface and passing the remainder therefrom with the liquid through said surface to further convey the fruit to a point of delivery.

Another object of the invention is to provide a method which in its successive steps provides for the transportation of the fruit from a plurality of points of preparation to a centralized delivery upon a grading surface and the separation of the fruit and liquid into a plurality of streams effecting a uniform distribution thereof during its passage through the grading mechanism.

The method may be carried out by various forms of apparatus and for the purpose of illustrating one construction for that purpose I have shown in my co-pending application filed June 26, 1925, Serial Number 39,766 for system of grading materials an arrangement of conducting troughs, grader, and delivery belts adapted to carry out the method. In this showing of the invention:

Figure 1 is a general plan of the parts in their associated relation;

Figure 2 is a side elevation of the grader;

Figure 3 is a detail section of one of the conducting throughs, and Figure 4 is an enlarged section on line 4—4 of Figure 2.

The method forming the subject of this application is adapted for general application but is specifically applicable in the canning of fresh or green fruits such as berries, for example, which are hulled at the preparation tables and immediately deposited in the troughs of water by which they are conducted to and through the grader. The use, therefore, of the term "fruit" in connection with the following specification is not intended as a limitation but descriptive of one application of the invention.

In the drawing like numerals refer to like parts in the several figures, and the numeral 10 designates a series of preparation tables which may be of any desired character and at which the fruit is hulled or otherwise prepared for canning and then deposited in the troughs 11 arranged above the table and carrying a stream of flowing liquid such as water. Where a series of tables are used these troughs 11 are connected with a trunk trough 12 which discharges at 13 upon the upper surface of a grader 14, thus providing for a collection and centralized discharge from the several troughs at the preparation tables.

The form of grader herein shown comprises a reciprocating or vibrating frame 15 having suspended therefrom at its upper end a grading surface 16 composed of a series of parallel bars suitably spaced apart to determine the first or primary grade, and the liquid carrying the fruit passes through these bars and deposits thereon such fruit as is of greater diameter than the spaces between the bars. This first grade of fruit is deposited by the movement of the grader upon the delivery conveyer 17 mounted in the usual manner upon the uprights 18 of the frame.

Extending beneath the grading surface 16 is a fixed corrugated or channeled water table 19 supported by the frame of the grader and discharging at its lower end upon a second grading surface 20 which is suspended from the frame 15 above described. The fruit retained by this latter grading surface is deposited upon a delivery conveyer 21 while the liquid passing therethrough enters a tank 22 or other suitable receptacle. Any desired number of grading surfaces may be provided, they being formed of differently spaced bars and disposed in successively lower planes so as to effect a feed by gravity both upon the grading surface and of the liquid upon the water table. This water table extends for the width of the grader and the water normally passing through the collecting troughs is not sufficient to form a complete stream over the same and conveys the fruit and liquid medium in a relatively narrow stream which is spread laterally into a wide thin stream by the provision of the channeled or corrugated surface 23 which causes the water and fruit to traverse parallel channels having sufficient depth to properly float the fruit and deliver it in a uniform layer upon the succeeding grading surface.

The vibrating frame 15 may be supported and actuated in any preferred manner, for instance as shown in Figure 2 hanger links 25 are pivotally mounted upon posts 26 and also pivotally connected at their lower ends to a pivot 27 carried by a bracket 28 depending from the frame 15. This pivot extends through a supporting plate 29 connected to the upper rail 30 of the grader frame and to the water table 19 and suitably slotted at 31 to permit oscillatory movement of the link. Motion is transmitted to the frame 15 by means of a pitman 32 extending from a cam member 33 upon the driving shaft 34 actuated by any suitable power connection such as the belt 35 extending from the motor 36 as in Figure 1.

The several delivery belts may also be driven by a common shaft as at 37 driven from a motor 38. The liquid supply is adapted to be conserved by returning the water from the collecting tank 22 at the delivery of the grader to the several troughs at the preparation tables and this is effected by means of a conducting pipe 39 extending to a circulating pump 40 from which a discharge pipe 41 passes and is provided with means 42 delivering into each of the troughs. When it is desired to add additional liquid this may be supplied by the pipe 43 controlled by a suitable valve 44. In the travel of the delivered fruit in different grades upon the conveyer 17 it is adapted to be discharged automatically into cans or containers as indicated at 45 by means of a guide 46 disposed in proper relation to the upper face of the belt so as to force the fruit toward one edge thereof beneath which the can is disposed.

It will be seen that the foregoing method provides for the continuous conduction of the fruit from its point of preparation to its position for delivery into a packing container, and that the movement of the fruit or material is effected by a flotation thereof in a body of liquid both to and through the grading mechanism wherein the liquid prevents the fruit from directly contacting with the table below when dropping through the grading surfaces and conveys the fruit in parallel streams over such surfaces providing for a direct and positive feed which prevents injury to fresh or ripe fruit and also benefiting the condition of such fruit due to the presence of the water during the grading action.

It will be understood that the successive grading surfaces as shown in Figure 1 are differently spaced so as to effect the number of grades desired and these surfaces are simultaneously vibrated or reciprocated to secure a feeding action of the fruit thereon for delivery to the belts. The water tables, however, are fixed in relation to the grader frame and the liquid carrying the material to be graded flows by gravity over the successive tables.

While the specific mechanism used in this system of grading has been shown and described, the method involved is not confined thereto and changes and alterations may be made in such apparatus without departing from the spirit of the invention as defined by the appended claims.

Having thus described my invention, what

I claim as new and desire to secure by Letters Patent is:

1. The method of grading fruit consisting in conveying it from a plurality of places of preparation by suspension in a flowing body of water, delivering the fruit at a centralized point to a grading device, and then conveying the fruit through said device with the body of liquid which cushions the flow of fruit from one position to another and spreads the fruit and water laterally into a wide and thin stream to maintain the fruit in separated condition.

2. The method of grading material consisting in introducing the same into a flowing body of liquid by which the material is separated and conveyed to a grader, retaining a portion of the material upon a grading surface and passing the remainder thereof with the liquid through said surface and spreading the fruit and liquid medium laterally into a wide thin layer of material uniformly distributed over said conducting surface, and then collecting the material from the grading surface.

3. The method of grading fruit consisting in introducing the same into a flowing body of liquid by which the fruit is supported and conveyed to a grader, passing the fruit over a series of successively arranged grading surfaces, and spreading the fruit and liquid medium into a series of shallow streams of liquid which support a uniformly distributed layer of fruit over said conducting surface.

4. A method of grading fruit consisting in depositing the same after preparation in a flowing body of liquid by which the fruit is supported and conveyed to a grader, then passing the fruit over a series of successively arranged grading surfaces, spreading the fruit and liquid medium laterally into a wide and thin stream, and then conveying the material retained by these separate grading surfaces and depositing it in receptacles.

5. A method of grading fruit consisting in depositing the same after preparation in a flowing body of liquid by which the fruit is supported and conveyed to a grader, then passing the fruit over a series of successively arranged grading surfaces, spreading the fruit and liquid medium laterally into a wide and thin stream, then conveying the material retained by these separate grading surfaces and depositing it in receptacles, and then collecting the liquid from the delivery point and returning it to the initial point of operation.

6. The method of grading fruit consisting in transporting the same in a body of flowing liquid by which it is discharged upon a grading surface, then collecting the liquid and fruit passing through said surface and distributing the same into a series of parallel streams for delivery to a succeeding grading surface.

7. A method of handling fruit which consists in conveying said fruit and a liquid medium in a relatively narrow stream, spreading the fruit and liquid medium laterally into a wide and thin stream, and separating the fruit having one charactertistic from fruit having another charactertistic.

8. A method of handling fruit which consists in conveying said fruit and a liquid medium in a relatively narrow stream, spreading the fruit and liquid medium laterally into a wide and thin stream, separating the fruit having one characteristic from fruit having another characteristic, and delivering the fruit of one characteristic on a level with its separation from the fruit of another characteristic.

9. The method of handling fruit which consists in conveying said fruit and a flowing liquid medium in a relatively thin stream, separating out of the flowing stream certain of the fruit and spreading the remaining fruit and liquid medium laterally into a wide and thin stream to arrange the fruit in a dispersed layer.

10. The method of grading fruit consisting in introducing it into a narrow flowing body of liquid, then passing the liquid and fruit through a grading device, and spreading the fruit and liquid into individual streams supporting a thin uniformly distributed layer of the fruit.

11. The method of grading fruit consisting in introducing it into a narrow flowing body of liquid, then passing the liquid and fruit through a grading device, spreading the fruit and liquid into individual streams supporting a thin uniformly distributed layer of the fruit, and disposing the fruit so spread upon a succeeding grading device.

In testimony whereof I affix my signature.

WILLIAM G. ALLEN.